INVENTOR.
Byron L. Brucken
BY
J. C. Evans
His Attorney

Dec. 9, 1969    B. L. BRUCKEN    3,482,298
METHOD OF MANUFACTURE OF WIRE FIN AND TUBE HEAT EXCHANGERS
Filed Oct. 22, 1965    5 Sheets-Sheet 2

INVENTOR.
Byron L. Brucken
BY
J.C. Evans
His Attorney

Dec. 9, 1969     B. L. BRUCKEN     3,482,298
METHOD OF MANUFACTURE OF WIRE FIN AND TUBE HEAT EXCHANGERS
Filed Oct. 22, 1965     5 Sheets-Sheet 3

INVENTOR.
Byron L. Brucken
BY
J. C. Evans
His Attorney

Dec. 9, 1969  B. L. BRUCKEN  3,482,298
METHOD OF MANUFACTURE OF WIRE FIN AND TUBE HEAT EXCHANGERS
Filed Oct. 22, 1965  5 Sheets-Sheet 4

INVENTOR.
Byron L. Brucken
BY
J. C. Evans
His Attorney

Dec. 9, 1969  B. L. BRUCKEN  3,482,298
METHOD OF MANUFACTURE OF WIRE FIN AND TUBE HEAT EXCHANGERS
Filed Oct. 22, 1965  5 Sheets-Sheet 5

INVENTOR.
Byron L. Brucken
BY
J.C.Evans
His Attorney

United States Patent Office 3,482,298
Patented Dec. 9, 1969

3,482,298
METHOD OF MANUFACTURE OF WIRE FIN AND TUBE HEAT EXCHANGERS
Byron L. Brucken, Dayton, Ohio, assignor to General Motors Corporation, Detroit, Mich., a corporation of Delaware
Filed Oct. 22, 1965, Ser. No. 501,991
Int. Cl. B23p 15/26
U.S. Cl. 29—157.3          5 Claims

ABSTRACT OF THE DISCLOSURE

A method including feeding an elongated tube at a predetermined rate, relatively rotating the wire and tube with respect to one another, and continuously directing the wire about the tube intermittently bending portions of the wire with respect to the tube at predetermined axial points thereon to form angularly offset loops on the tube located at circumferentially spaced points around the tube.

---

This invention is directed to a wire fin and tube heat exchanger and more particularly to a wire fin and tube heat exchanger having an extended wire fin surface.

Heat exchangers of the type having an extended heat transfer area, such as are commonly used as evaporators in refrigerators, air conditioners and the like, are often characterized by the provision of a large number of separate parts that make up the heat exchanger unit. For example, in many cases, a plurality of fins are separately mounted with respect to the tubing of the heat exchanger to produce an extended heat transfer surface capable of performing a given heat transfer function within a limited volume of heat exchanger unit. Another way of increasing the heat transfer surface in a heat exchanger is by the provision of a wire fin surface thereon. Wire fin type heat exchangers have taken many forms, but to a greater or lesser degree have all required rather complex methods of manufacture to produce the resultant article.

An object of the present invention, therefore, is to improve the method of manufacture of wire fin heat exchangers by continuously forming an extended wire fin surface along the length of a tube without requiring any intermediate handling steps of the tube during the formation of the extended surface on the tube.

A further object of the present invention is to improve the manufacture of extended surface wire fin type heat exchangers by the provision of an improved method of manufacture including the continuous winding of a wire element along the length of a tubular member wherein a plurality of continuously angularly advanced loops are formed on the outer circumference of the tube along the length thereof with portions of the looped wire contacting the tube in good heat transfer relationship and other portions of the wire being spaced radially outwardly of the tube to form air flow passageways between the wire loops and the tube.

Still another object of the present invention is to improve the manufacture of extended heat exchangers of the wire fin type by the provision of an improved method of manufacture including the steps of continuously relatively moving a tube and a length of wire with respect to one another whereby the wire is continuously orbitally looped about the outer circumference of the wire along the length thereof to form a plurality of axially located loops thereon and wherein each of the loops is angularly offset with respect to one another through a predetermined angular relationship to cause the loops to be continuously curved about the length of the tube in a spiral fashion so as to define curvilinear spaces adjacent the outer circumference of the tube from one side to the opposite side thereof.

Still another object of the present invention is to form an extended surface heat exchanger of the wire fin type by precoating portions of a reach of wire and the outer surface of a tubular fluid flow member with a bonding agent, relatively moving the precoated wire and tube with respect to one another so that portions of the presoldered wire and presoldered tube are located in direct contact with one another and other portions thereof are located in spaced relationship with one another, orbitally looping the wire during the relative movement of the tube and wire with respect to one another to form a continuous series of loops of wire on the tubular member angularly offset from one another and axially spaced from one another along the length of the tube, and heating the wound wire and tube to cause the precoated contacting portions of the tubular member and wire to be fused into good mechanical and heat conductive connection with one another.

Yet another object of the present invention is to improve the manufacture of an extended surface heat exchanger of the wire fin type by the steps of continuously winding a predetermined reach of wire with respect to a predetermined elongated tubular member wherein portions of the wire are in good heat transfer contact with the tube and other portions of the wire are formed as loops around the tube at angularly offset positions about the circumference thereof and spaced apart points along the length thereof, and applying a bonding material to the wound wire and tubular member and subsequently heating the bonding material to cause it to flow to the outer surface of the tube for bonding the portions of the wire fin contacting the outer surface of the tube thereto.

Still another object of the present invention is to improve heat exchangers by the provision of an improved combination tube and wire arrangement that includes a continuously wound wire fin on a predetermined length of a fluid conducting tubular member wherein the continuously wound wire fin is formed as a continuously angular offset plurality of loops along the length of the tubular member with each of the loops having a portion thereof in good heat transfer contact with the tubular member and another portion thereof located in radially spaced relationship with the tubular member for defining an extended heat transfer surface on the tubular member.

Still another object of the present invention is to improve extended surface heat exchangers of the wire fin type by the provision of a continuously formed wire fin located along the length of a tubular fluid flow member and wherein the continuous wire fin is formed as a plurality of interconnected, angularly offset loops around the outer circumference of the tubular member with each of the loops being located at spaced apart points along the length of the tubular member and including an apex portion thereof located radially outwardly of the circumference of the tube and a radially inwardly bent portion thereof located in good heat transfer contact with the outer circumference of the tube.

A more specific object of the present invention is to improve heat exchangers of the type set forth in the preceding object by the provision therein of a preselected angular offset relationship between each of the loops on the elongated tubular member wherein the resultant loops on the tubular member are formed in a continuous curvilinear fashion about the outer circumference of the tube along the length thereof to define a space closely adjacent the tube that is continuously opened along a curved path along the length of the tube from one side to an opposite side of the tube.

Still another object of the present invention is to provide an improved machine including means for continuously winding a wire in a tube to form an extended surface heat exchanger.

Further objects and advantages of the present invention will be apparent from the following description, reference being had to the accompanying drawings wherein preferred embodiments of the present invention are clearly shown.

Referring now to FIGURES 1 through 5, an improved machine for manufacturing an extended surface heat exchanger of the wire fin type is illustrated as including a coating station 20, a winding station 22, and a heat treating station 24.

Figure 1:
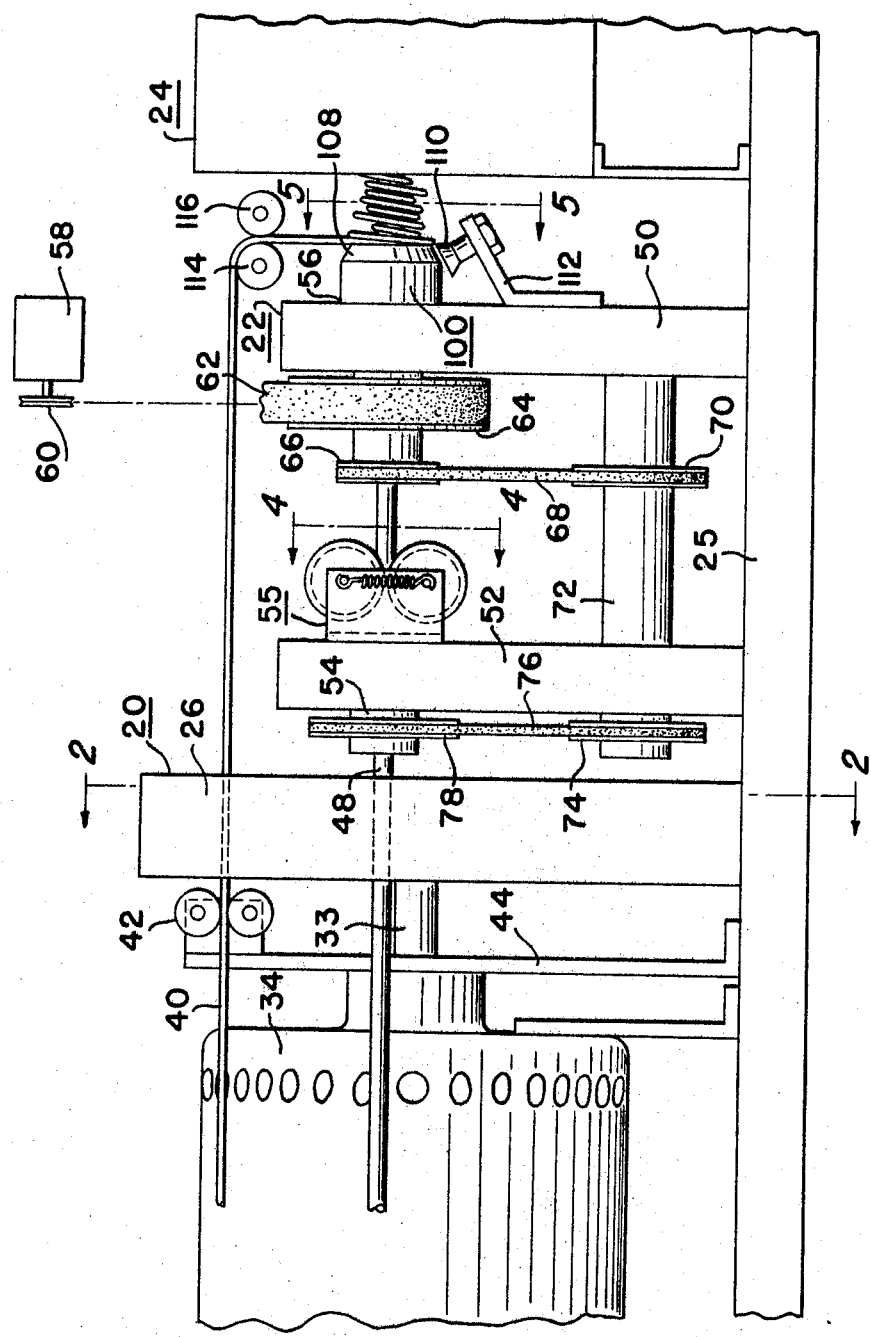
FIGURE 1 is a view of a plural station machine for manufacturing one embodiment of the present invention in accordance with an improved method of manufacture of the article.
Figure 2:
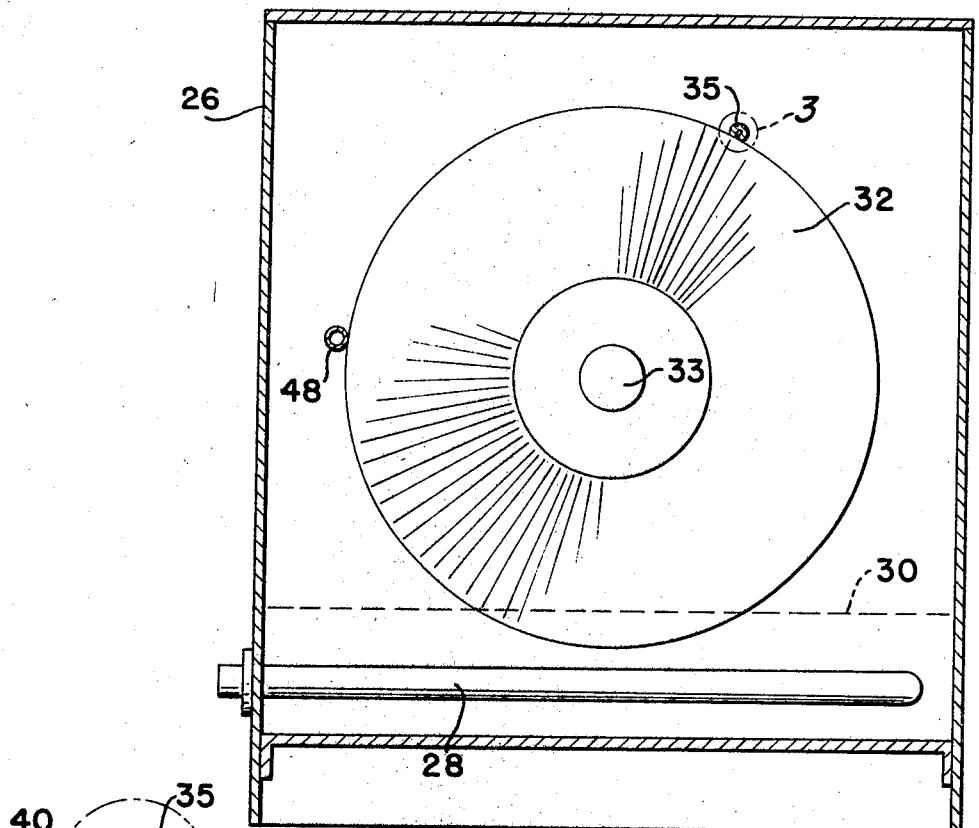
FIGURE 2 is an enlarged view in vertical section taken along the line 2—2 of FIGURE 1.

The coating station 20 is illustrated in the machine of FIGURES 1 through 5 as including a container 26 having a heater 28 in the bottom thereof that maintains a predetermined temperature in the container for melting a suitable bonding material, for example a tin solder, which is maintained at the level 30 in the container 26, as shown in FIGURE 2.

Figure 3:
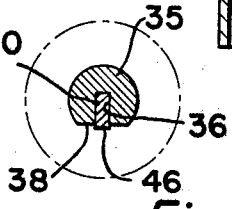
FIGURE 3 is an enlarged view in vertical section of the region 3 in FIGURE 2.

Within the container 26 is located a wire wheel 32 having a portion of the periphery thereof located below the level 30 of the solder in the container 26. The wire wheel 32 is supported on a shaft 33 that is directed through one of the side walls of the container 26 to be drivingly connected to a motor 34 for rotating the wheel 32 within the container 26. As the wheel 32 rotates, it is moved with respect to an insert member 35 that is best seen in FIGURE 3 as having a groove 36 formed therein and a flattened surface 38 thereon that is located in a tangent relationship with the outer periphery of the wire wheel 32. A length of wire 40 is fed through a pair of rollers 42 supported on a frame member 44. The rollers 42 are configured to flatten one surface of the wire 40 as at 46, as shown in FIGURE 3. The flattened surface 46 of the wire 40 is directed from the rollers 42 through the front wall of the container 26 and into the insert 35 that locates the flat surface 46 of the wire 40 tangent to the wheel 32.

In addition, an elongated, tubular member 48 is directed through the walls of the container 26 so that the outer surface thereof is located tangent to the wheel 32 as seen in FIGURE 2.

The winding station 22 includes an end frame 50 and an end frame 52 supported by the base 25 at spaced apart points thereon. Within the base member 52 is rotatably supported a first tubular guide member 54 that has a tube rotating head assembly 55 secured on one end thereof. A second rotatable tubular guide member 56 is rotatably supported on the frame member 50 in axial alignment with the first rotatable guide member 54. The tubular guide member 56 is rotated relative to the frame member 50 by an electric motor 58 that has a drive pulley 60 thereon with a belt 62 passing thereover that drivingly engages a driven pulley 64 on an inboard end of the tubular guide member 56. At the innermost end of the tubular guide member 56 is located a speed increasing pulley 66 that has a belt 68 passed thereover to engage a pulley 70 on a speed transfer shaft 72 having the opposite ends thereof journalled respectively in the frame members 50 and 52. An outboard end of the shaft 72 has a pulley 74 thereon over which a belt 76 passes to engage a pulley 78 on the outboard end of the first tubular guide member 54 for causing rotation of the tube rotating head assembly 55.

Figure 4:
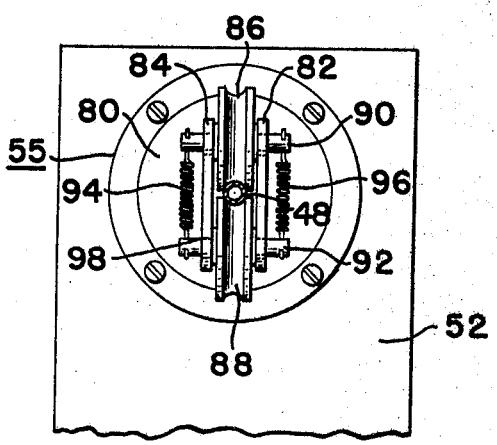
FIGURE 4 is an enlarged view in vertical section taken along the line 4—4 of FIGURE 1.
Figure 5:
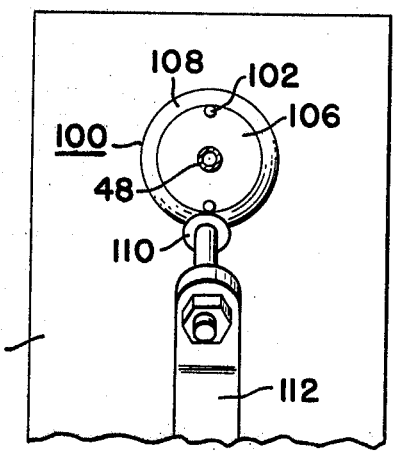
FIGURE 5 is an enlarged view in vertical section taken along the line 5—5 of FIGURE 1.

The tube rotating head assembly 55, more particularly, includes a base plate 80 on the inboard end of the tubular guide member 54 which has a pair of spaced apart flanges 82, 84 thereon as best seen in FIGURE 4. The tubular member 48 is directed from the soldering station 20 interiorly of the guide member 54 and thence between the flanges 82, 84 to be engaged by a pair of rollers 86, 88 that coact to serve as jaws for clamping the tubular member 48 for rotation with the head assembly 55. The rollers 86, 88 are supported on shafts 90, 92, respectively, each of which is directed through the spaced apart flanges 82, 84 for supporting the rollers 86, 88 on the flanges 82, 84. The ends of the shafts 90, 92 are interconnected by spring members 94, 96, respectively, to bias the rollers 86, 88 into frictional engagement with the tube 48 whereby on rotation of the guide member 54 and head assembly 55, the tube 48 is rotated at a predetermined rate as established by the belt-pulley system between motor 58 and the rotatable guide member 54. Openings 98 in the flanges 82, 84 through which the ends of the shafts 90, 92 pass are slotted to provide for good press fit of the rollers 86, 88 against the tubular member 48 passing therebetween.

The tubular member 48 is directed from the tube rotating head assembly 55 into the inboard end of the second tubular guide member 56 that is rotatably supported on the frame member 50.

The tubular member 48 is directed through the guide member 56, thence through a hollow winding spindle head 100 that includes diametrically spaced pins 102, 104 on the outer periphery of the end face 106 thereof. The face 106 is located forwardly of a tapered surface 108 on the winding spindle head 100.

Figure 6:
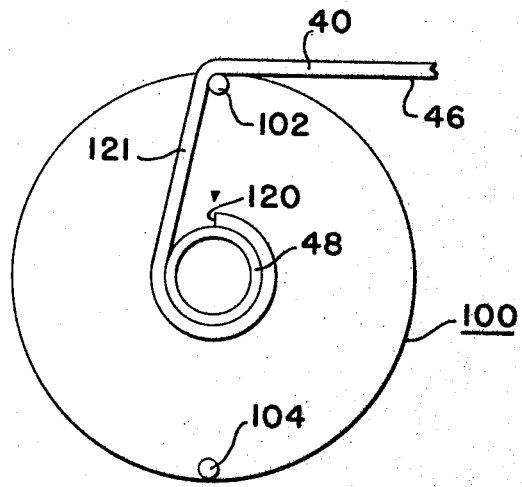
FIGURE 6 is an enlarged view in front elevation of a winding spindle in the present invention showing the tube and wire at one stage of manufacture thereof.

One embodiment of the improved process of the present invention includes feeding the wire 40 and tubular member 48 through the solder container 26 so that the flat edge 46 of the wire 40 is coated with solder and the outer periphery of the tubular member 48 is coated with solder. The wire and tubular member are fed through the wire feed and winding stations, respectively, so that an end of the tubular member 48 is directed from the outboard end of the spindle winding head 100 and the wire is passed through the directional rollers 114, 116 about the winding head pin 102 as seen in FIGURE 6. An end 120 of the wire 40 is connected to the periphery of the tube 48, as shown in FIGURE 6, at the start of the winding step of the improved process. The motor 58 is energized to cause relative rotation of the head 100 and the tube 48 with the tube 48 being rotated by the roller head assembly 55 in the illustrated machine at a predetermined increased speed with respect to the speed of rotation of the head 100.

In FIGURES 6 through 11, various stages of the winding are specifically set forth, including the initial step of connecting the wire to the tube, as shown in FIGURE 6, at which point the head and tube are at their initial starting point with the wire 40 being wrapped about the outer periphery of the tube 48 with the flat surface 46 of the wire 40 being in contact with the outer circumference of the tube 48 from the point 120 to a point tangent to the tube thence to pass about the pin 102 back to rollers 114, 116.

Figure 7:
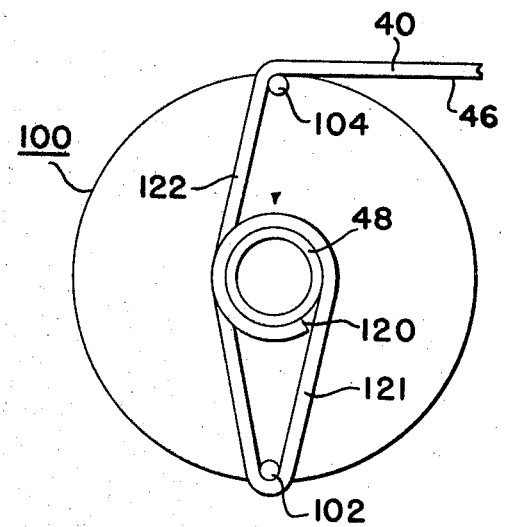
FIGURE 7 is a view like FIGURE 6 showing a subsequent stage of manufacture.

As shown in FIGURE 7, when the head is rotated 180° from the portion in FIGURE 6, the pin 102 draws a reach of wire 122, onto the head between the pins 102, 104. The tube, because of the greater rate of rotation thereof, is advanced 34° ahead of the head 100.

Figure 8:
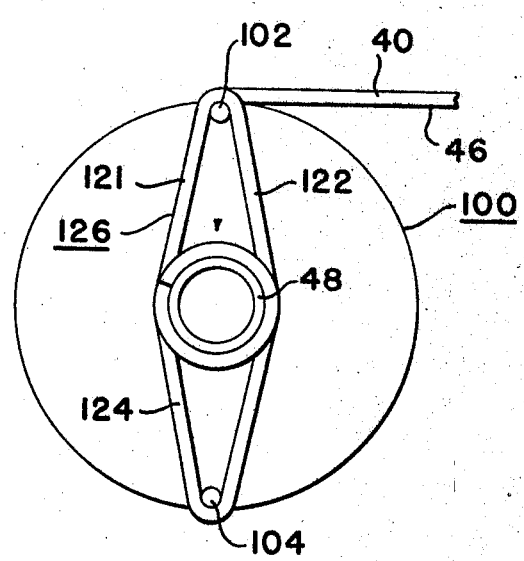
FIGURE 8 is a view like FIGURE 6 showing a still further step in the manufacture of the invention.

In FIGURE 8, a further stage of the winding step is illustrated wherein the head 100 has been rotated 360° from its initial portion and the tube rotated 360° plus 68° representing the greater rate of rotation of the tube. At this time the reach of wire 122 about the pins 102, 104 is orbited about the axis of tubular member 48 into the position shown in FIGURE 8, and an additional reach of wire 124 is drawn by the pin 104 across the pin 102 behind the reach 122 and the lead reach 121. Upon the rotation, as shown in FIGURES 7 and 8, the greater rate of rotation of the tube causes the lead reach 121, in part, to be wrapped around the outer circumference of the tube 48 so as to draw the reach 122 from the pin 104 and around the pin 102. Eventually this drawing action will cause the reach of wire 122 to be bent about the outer circumference of the tubular member 48 through an increasing angle.

Figure 9:
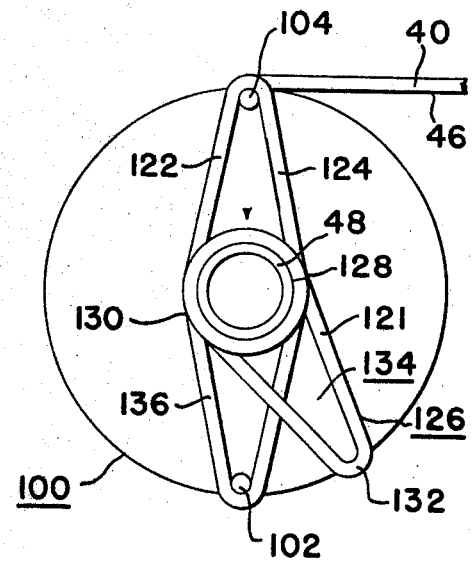
FIGURE 9 is a step of the manufacture advanced from that shown in FIGURE 8.

As shown in FIGURE 9, when the head 100 has rotated 180° from the position shown in FIGURE 8 into its second turn, the lead reach 121 and the part of the reach 122 that is connected thereto are released from the head 100 by the wire camming element 110 to form a first loop 126 on the outer circumference of the tubular member 48. The first loop 126 is characterized by having bent ends 128, 130 thereon located in good heat transfer contact with the outer surface of the tubular member 48 and an apex portion 132 located radially outwardly of the outer circumference of the tube 48 to form an air flow passageway 134 between the loop 126 and the tubular member 48. At the stage of the winding shown in FIGURE 9, the reach 124 is located with respect to the tubular member 48 as was the reach 122 in the stage shown in FIGURE 8, and another reach of wire 136 is drawn by the pin 102 about the pin 104 rearwardly of the reach 124.

Figure 10:
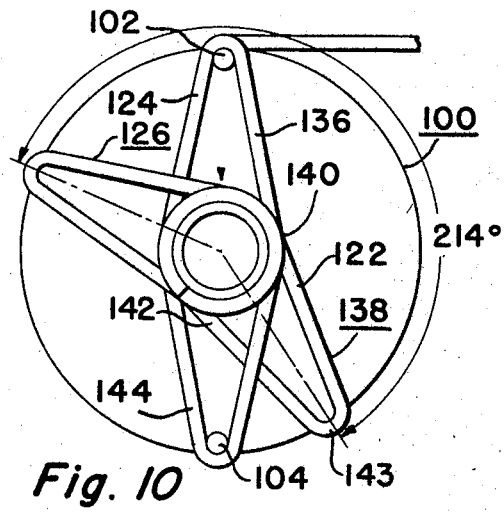
FIGURE 10 is a step advanced from that shown in FIGURE 9.

Following the formation of a first loop 126, as shown in FIGURE 9, when the head has been rotated 360° in its second turn, the wire loop 126 is positioned, as illustrated in FIGURE 10, and the reach of wire 124 is bent around the outer periphery of the tubular member 48. At this time the portion of the reach of wire 124 connected to the reach of wire 122 is released from the head 100 by the wire camming element 110 to form a second loop 138 having end portions 140, 142 bent into good heat transfer contact with the outer circumference of the tubular member 48 on a portion of the circumference of the tubular member located behind that portion contacted by the ends 128, 130 of the loop 126. The loop 138 has an apex portion 143 like that of loop 126.

The loop 138 is angularly offset from the loop 126 through an angle of approximately 214° in the illustrated embodiment of the invention.

At the stage of winding shown in FIGURE 10, the reach of wire 136 is orbited by head 100 about tubular member 48 and positioned as shown, and another reach of wire 144 is drawn by the pin 104 across the pin 102 behind the reach 136 on the head 100.

Figure 11:
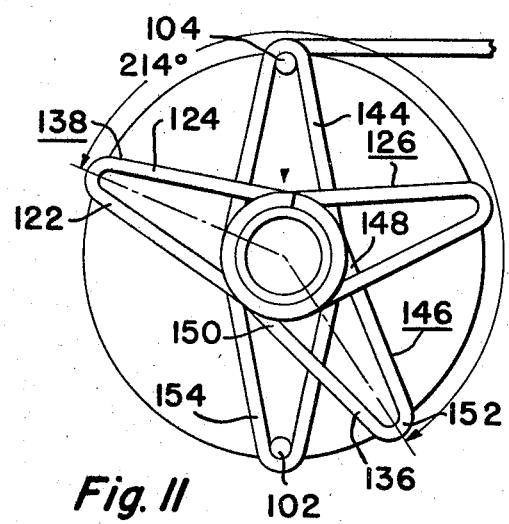
FIGURE 11 is a step advanced from that shown in FIGURE 10.

Upon a 180° portion of turn number three, as shown in FIGURE 11, the loops 126 and 138 are positioned as shown and an additional loop 146 is formed by parts of the reaches 124 and 136 as were loops 126 and 138 as previously discussed. The loop 146, like the previous loops, has end portions 148, 150 that are bent about the outer circumference of the tubular member 48, and it, additionally, includes an apex 152 like those in the previously formed loops. At this stage of the winding, the reach 144 is positioned as illustrated and a still further reach 154 is carried by the pin 102 across the pin 104 onto the head 100 rearwardly of the reach 144. The added loop 146 is angularly offset from the last formed loop 138 through an angle of 214° as shown in FIGURE 11.

Further rotation of the head and tube with respect to one another produces a continuous formation of angularly offset loops on the tubular member 48 with succeeding loops having the same angular displacement with respect to one another and being located at axially spaced points on the length of the tubular member 48. The formation of the loops and the releasing action of the camming element 110 pulls the tubular member 48 through the winding station 22 and directs the wound wire and tube into the heating station 24 where the solder is heated to its melt temperature to cause the contacting portions of the wire and tubular member to be fused one to the other by a layer of bonding agent 155, as seen in FIGURE 13, for mechanically securing the wound wire on the tubular member.

Figure 12:
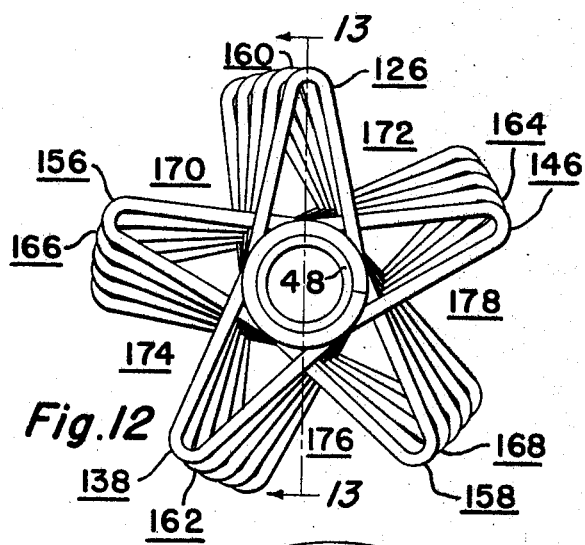
FIGURE 12 is a view in end elevation of the assembled tube and wire heat exchanger of the present invention showing a portion of the formed loops thereon.
Figure 13:
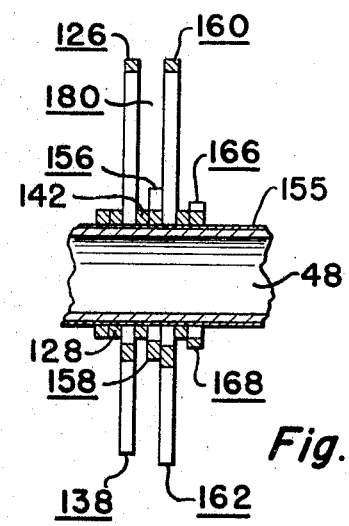
FIGURE 13 is a vertical, sectional view taken along the line 13—13 of FIGURE 12.

In FIGURES 12 and 13, a number of the finished loops on the tubular member 48 are illustrated including the sequentially formed loops 126, 138, 146 and succeeding loops 156, 158. These loops, in one form of the present invention, constitute a five-point loop system which is repeated upon continually rotating the wire and tube at loops 160, 162, 164, 166 and 168. It will be noted that by preselecting a particular angle between the succeeding loops the formed loops in each set of five points are angularly offset from one another. Thus, in FIGURE 12 the initial loops that are located on the top of the tubular member eventually curve downwardly about the outer circumference of the tubular member 48 so that the space 170 bounded by the top loops 126, 160 and side loops 156, 166 moves in a counterclockwise curvilinear fashion about the outer periphery of the tubular member and likewise the space 172 between the top loops 126, 160 and the opposite side loops 146, 164 moves upwardly in a counterclockwise direction about the outer periphery of the tube. Spaces 174, 176 and 178 between other of the loops move in a similar curvilinear fashion about the outer circumference of the tubular member 48 along the length thereof.

By virtue of this arrangement, when the wire fin and tubular member are located in certain environments, for example, as an evaporator section in a frost-proof refrigerator, when cold moist air is passed over certain of the loops as for example the loops 126, 160, so as to deposit frost thereon to close a gap 180 therebetween, and assuming that air flow is passing from the space 170 to the space 172, as seen in FIGURE 12, when the flow passageways 180 are blocked, the space 170 will provide relief for the air flow about the wire fin tube section so that cold air will be continually circulated in the system.

Figure 15:
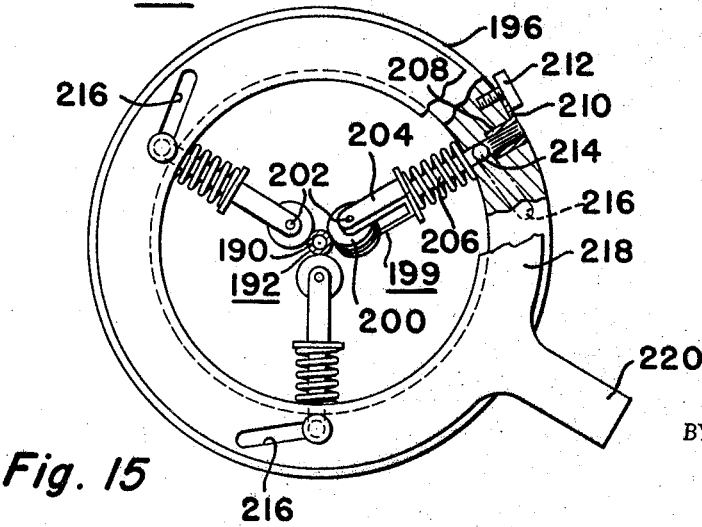
FIGURE 15 is a view in vertical section taken along the line 15—15 of FIGURE 14.
Figure 14:
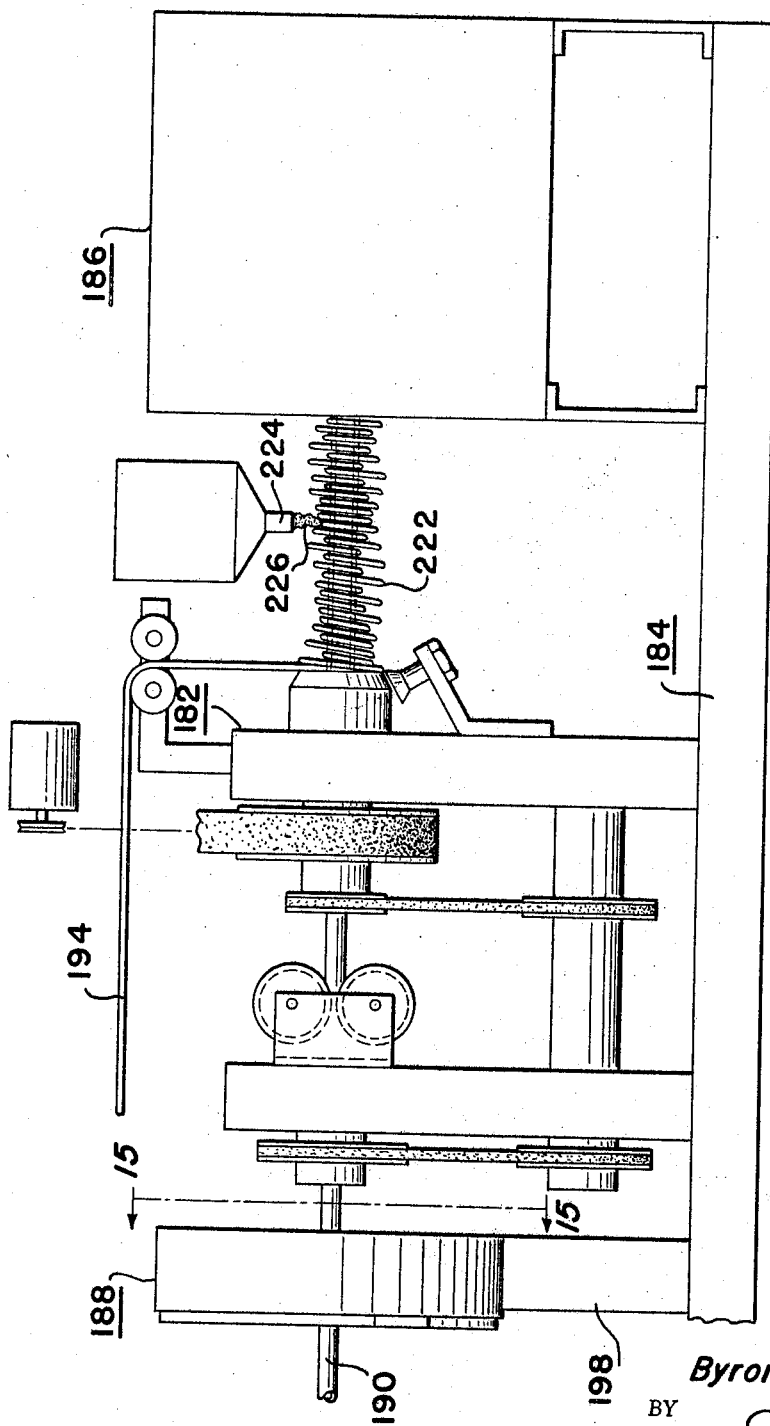
FIGURE 14 is a view of a machine for carrying out the steps of another embodiment of the improved process of the present invention.

Referring now to FIGURES 14 and 15, another machine arrangement constructed in accordance with the present invention is illustrated for carrying out another embodiment of the process of the present invention. In this arrangement, a winding station 182 is illustrated identical to the winding station 22 of the first embodiment. The winding 182 is mounted on a base 184 between a heating station 186 and a variable advance mechanism 188. In this arrangement, a tubular member 190, like tubular member 48, is directed through a central opening 192 in the variable advance mechanism 188 to be received by the winding station 182 in the same fashion as was the tubular member 48 in the first embodiment. A length of wire 194 is directed to the winding station 182 as was the wire 40 in the first embodiment. In this arrangement, however, the wire 194 and tubular member 190 are moved with respect to one another to carry out the winding of the wire 194 on the tubular member 190 prior to application of bonding material thereon.

The variable advance mechanism 188 is set forth more specifically in FIGURE 15 as including an annular member 196 secured on a frame member 198 supported by the base 184. At circumferentially located points on the member 196 are located tube gripping roller assemblies 199. Each of the assemblies 199 includes a roller 200 rotatably supported by a pin 202 in a bifurcated arm 204 on the end of a shaft 206 that has a splined end thereof received within a bushing 208 rotatably supported within the fixed member 196. The outer end of the bushing 208 has a calibrated disc 210 secured thereto that is adjustable with respect to the fixed member 196 for rotating the shaft 206 relative to the fixed member 196 for varying the skew of the roller 200 with respect to the tubular member 190. When a predetermined skew relationship between the roller 200 and the tubular member 190 is selected, a clamp screw 212 is fastened to the fixed member 196 for holding the tubular bushing 208 and shaft 206 in a predetermined angular relationship with the fixed member 196. A follower pin 214 is secured to the shaft 208 and directed through a cam opening 216 in a movable release ring 218 having an actuating arm 220 thereon. When the arm 220 is moved to rotate the release ring 218 with respect to the annular fixed member 196, the follower pin 214 is moved by the camming groove 216 so as to axially move the splined shaft 206 in the bushing 208 to release the skewed rollers 200 from the tubular member 190.

The amount of skew of the rollers with respect to the tubular member 190 will cause a greater or lesser rate of advance of the tubular member 190 into the winding station 182.

Accordingly, the rate of advance of the tube 190, with respect to the wire 194 being wound thereon, is variable whereby the wire loops formed on the outer circumference of the tubular member 190 can be spaced at preselected points along the length of the tube 190 to provide a greater or lesser spacing therebetween.

In the process carried out on the machine arrangement of FIGURE 14, once the wire 194 is wound on the tubular member 190, the extended surface assembly 222 is moved with respect to a nozzle 224 for distributing a strip of bonding material 226 along the length of the completed article 222. The coated wire and tubular member 222 are then passed interiorly of the heating station 186 for causing the bonding material to flow into the contacting surfaces between the wound wire and the tubular member for physically connecting them together.

In one process the tubular member is formed of aluminum and the wire of aluminum. The bonding material distributed by the nozzle 224 is a reaction flux including the following ingredients: zinc chloride 44 ounces per weight, ammonium chloride 5 ounces per weight, sodium fluoride 1 ounce per weight, water (soft or treated) 5.75 ounces per weight. The flux material is mixed as a homogeneous mass and during usage, water is added to maintain proper working consistency. The flux is applied as a strip to coat the tube and wire by flow coating.

The coated aluminum tube and wire assembly is heated between the temperatures of 720° F. to 800° F. to react the flux so that the metallic material therein flows into the contacting surfaces between the wire and tube to connect the wire securely to the tube.

While in the illustrated arrangement, the heating station is shown representatively as being a furnace, the invention can be practiced by heating the reaction flux with a torch or by induction heating of the wire and tube assembly.

Following reaction of the flux, the residues of the flux are removed by washing the tube with hot water and applying heat to the tube. If a bright finish is desired, the tube and wire can be subjected to a cleaning operation, as for example by passing it to a nitric acid solution followed by a clean water rinse drying operation as necessary.

While the embodiments of the present invention as herein disclosed constitute preferred forms, it is to be understood that other forms might be adopted.

What is claimed is as follows:

1. A method for forming a wire fin and tube heat exchanger comprising the steps of, providing a length of tubular member, providing a length of wire, relatively rotating a portion of the wire with respect to the tube, bending a portion of wire with respect to the tube at a predetermined axial point thereon to form a loop of wire on the circumference of the tube, axially advancing the tube with respect to the relatively rotating wire to receive another portion of the wire, bending the other portion of wire on the circumference of the tube to form a second loop on the tube angularly offset from the first loop, continuing the advance of the tube and looping a subsequent portion of the wire on the tube to form another loop on the outer circumference of the tube angularly offset from the first tube and axially spaced therefrom on the circumference of the tube.

2. In the combination of claim 1, continuously fromming angularly offset loops on the outer circumference of the tube along the axial length thereof, preselecting the offset angular relationship between the loops to cause the plurality of loops to be wound in a curved fashion about the circumference of the tube along the length thereof, and spacing the loops curving around the tubes one from the other to form a continuously curvilinear opening about the tube along the length thereof.

3. A method for forming a wire and tube heat exchanger comprising the steps of, providing a length of elongated tubular member, providing a length of wire, relatively rotating the tube and wire with respect to one another, continuously directing the wire length about the tube and intermittently bending portions of the wire with respect to the tube a predeermined axial points thereon to form angularly offset loops on the tube located at circumferentially spaced points around the tube, applying a bonding agent along the length of the wound wire and tube, heating the bonding agent to secure the wire and tube together at their engaging surfaces.

4. A method for forming a wire fin and tube evaporator comprising the steps of, directing an elongated tube in a predetermined direction, feeding a predetermined length of wire around said tube, rotating said tube on its longitudinal axis, relatively rotating said length of wire around said tube continuously directing the wire length during the relative rotation between it and the tube and bending segments of the wire with respect to the tube at predetermined axial points to form angularly offset loops on the tube located at circumferentially spaced points around the tube.

5. A method for forming a wire fin and tube heat exchanger comprising the steps of, providing an elongated tube, providing a length of wire, precoating the length of wire with a bonding agent, precoating the outer surface of the tube with a bonding agent, relatively rotating the wire with respect to the tube, continuously directing the wire length about the tube and intermittently bending portions of the wire with respect to the tube at predetermined axial points thereon to form angularly offset loops on the tube located at circumferentially spaced points around the tube, continuously advancing the tube and wound wire in a predetermined direction and heating the advancing wound wire and tube so that the contacting coated surfaces on the wire and tube are bonded to one another.

References Cited

UNITED STATES PATENTS

| | | | |
|---|---|---|---|
| 877,252 | 1/1908 | Stolp | 29—157 |
| 2,308,319 | 1/1943 | Stanton | 29—157 |
| 2,948,796 | 8/1960 | Wall | 29—157 |
| 3,217,392 | 11/1965 | Roffelsen | 29—157 |
| 3,265,276 | 8/1966 | Roffelsen | 29—157.3 X |
| 3,353,250 | 11/1967 | Kikuchi et al. | 140—92.2 X |
| 822,372 | 6/1906 | Kitchen et al. | 165—184 |
| 2,494,286 | 1/1950 | Collins | 29—202 |
| 2,500,501 | 3/1950 | Trumpler | 29—157 |
| 3,114,963 | 12/1963 | Kritzer | 29—202 |

JOHN F. CAMPBELL, Primary Examiner

D. C. REILEY, Assistant Examiner

U.S. Cl. X.R.

29—33, 202; 72—142; 140—92.2